United States Patent [19]

Smiley

[11] 4,414,063
[45] Nov. 8, 1983

[54] REMOVING RESIDUAL ACRYLONITRILE IN AQUEOUS DISPERSIONS

[75] Inventor: Robert A. Smiley, Wilmington, Del.

[73] Assignee: E. I. Du Pont de Nemours & Co., Wilmington, Del.

[21] Appl. No.: 367,755

[22] Filed: Apr. 12, 1982

[51] Int. Cl.$^3$ .............................. B01D 3/36; C08F 6/10
[52] U.S. Cl. .............................. 203/66; 159/DIG. 10; 203/DIG. 3; 528/496
[58] Field of Search .......... 203/66, DIG. 3, DIG. 23; 156/DIG. 10; 526/912; 528/496

[56] References Cited

U.S. PATENT DOCUMENTS

| | | | |
|---|---|---|---|
| 2,388,506 | 11/1945 | Teter | 203/66 |
| 3,438,870 | 4/1969 | Roscher et al. | 203/60 |
| 3,441,484 | 4/1969 | Teaney | 203/91 |
| 3,442,772 | 5/1969 | Kudo et al. | 203/85 |
| 3,451,899 | 6/1969 | Sheely | 203/69 |
| 3,468,763 | 9/1969 | Pugach | 203/48 |
| 3,480,516 | 11/1969 | Tindall | 203/66 |
| 3,480,517 | 11/1969 | Tindall | 203/70 |
| 3,507,755 | 4/1970 | Bitners et al. | 203/84 |
| 3,635,917 | 1/1972 | Roth et al. | 159/DIG. 10 |
| 3,980,529 | 9/1976 | Wilhelm et al. | 159/DIG. 10 |
| 4,251,412 | 2/1981 | Ferrini | 260/29.6 PT |
| 4,255,307 | 3/1981 | Miller | 260/29.6 PT |

FOREIGN PATENT DOCUMENTS

| | | | |
|---|---|---|---|
| 620268 | 5/1961 | Canada | 203/66 |
| 28348 | 5/1981 | European Pat. Off. | |

OTHER PUBLICATIONS

"Determination of Small Amounts of Acrylonitrile in Aqueous Industrial Streams" Daues et al. Analytical Chemistry, vol. 29, No. 7, Jul. 1957, pp. 1035–1037.

Primary Examiner—Bradley Garris

[57] ABSTRACT

Removal of acrylonitrile from latex by azeotropic distillation with methanol.

5 Claims, No Drawings ic # REMOVING RESIDUAL ACRYLONITRILE IN AQUEOUS DISPERSIONS

BACKGROUND OF THE INVENTION

1. Field of the Invention

The present process is directed to the removal of acrylonitrile monomer from aqueous dispersions of acrylonitrile polymers and, more particularly, to the removal of acrylonitrile monomer by the addition of methanol to the aqueous dispersion and thereafter distilling a methanol-acrylonitrile azeotrope from the dispersion until the level of free acrylonitrile therein is reduced to less than 10 and usually less than 1.0 ppm.

2. Description of the Prior Art

U.S. Pat. No. 3,480,516 issued on Nov. 25, 1969 discloses a process for separating nitroalkanes from alkanes by adding methanol to the mixture and thereafter distilling to remove a methanol-alkane azeotrope. European Patent Application No. 0028348 published May 13, 1981 discloses removing free acrylonitrile from acrylonitrile containing polymers in the form of an aqueous dispersion or emulsion by azeotropic distillation with water. However, it has been recognized that such a distillation allows residual amounts of free acrylonitrile to remain in the system. The aforementioned application teaches that after water stripping the residual acrylonitrile may be further reduced by adding additional catalyst and comonomers in excess of the amount of free acrylonitrile present after at least 90% of the monomers have been polymerized.

U.S. Pat. No. 4,251,412 issued on Feb. 17, 1981 discloses the removal of residual acrylonitrile from acrylonitrile polymers in aqueous systems by addition of an amine to the system.

It is known that acrylonitrile and methanol form an azeotrope which boils at 61.4° C. at atmospheric pressure and contains 38.7% by weight acrylonitrile. The use of this azeotrope to separate acrylonitrile from water and thereby permit analysis of small amounts of acrylonitrile is discussed in "Determination of Small Amounts of Acrylonitrile in Aqueous Industrial Streams" Daues et al., Analytical Chemistry, Vol. 29, No. 7, July 1957, pp. 1035-37.

SUMMARY OF THE INVENTION

Process for the removal of residual acrylonitrile from acrylonitrile polymers which are in the form of aqueous dispersions or emulsions comprising or consisting of adding at least about 1.5 parts and usually 7.5-15 parts by weight of methanol for each part by weight of free acrylonitrile in the emulsion or dispersion and thereafter distilling off a methanol-acrylonitrile azeotrope until the concentration of free acrylonitrile in the system is reduced to less than 10 ppm and usually to essentially undetectable amounts of less than about 1.0 ppm. The methanol is introduced in a form, e.g., as a 50% aqueous solution, which will not interfere with the emulsion or dispersion, e.g., by causing coagulation.

An advantage of the process of this invention is that by means of this technique free acrylonitrile dissolved in the polymer particles may also be removed and not be present in undesirable amounts. This technique for decreasing the acrylonitrile content of water systems containing free acrylonitrile may be used widely in the case of acrylonitrile latices. Normally a preferred procedure would be to steam and/or vacuum strip the latex to remove as much acrylonitrile as possible then use methanol stripping to remove the remainder of the acrylonitrile. Such a combination of processes permits the use of less methanol.

DETAILED DESCRIPTION OF THE INVENTION

Systems to which the process of the present invention can be applied are those in which acrylonitrile is polymerized and/or copolymerized in an aqueous medium. Polymers prepared in such systems which contain predominantly acrylonitrile are useful as molding resins. Copolymers of acrylonitrile with butadiene wherein the acrylonitrile is less than about 50% of the monomeric units exhibit enhanced oil resistance. Copolymers of acrylonitrile with acrylates produce oil resistant elastomers while those which contain a major portion of styrene and minor portions of acrylonitrile are useful in modifying vinyl chloride polymers.

Acrylonitrile may be homopolymerized or copolymerized with vinyl comonomers, e.g., butadiene styrene or acrylates such as methylacrylate, ethylacrylate, butylacrylate. In addition to the foregoing comonomers, vinyl comonomers having at least one terminal $CH_2=C$ group may be copolymerized with the acrylonitrile. Examples of such vinyl comonomers include vinyl aromatics, such as $\alpha$-methyl styrene, $\beta$-methyl styrene and chlorostyrene; $\alpha$-olefins, such as ethylene, propylene and isobutylene; vinyl halides such as vinyl chloride, vinyl esters such as vinyl acetate; other $\alpha,\beta$-olefinically unsaturated nitriles such as methacrylonitrile; alkyl vinyl ethers such as methyl vinyl ether; vinyl ketones, vinyl pyridine and $\alpha,\beta$-olefinically unsaturated amides, such as acrylamide. Polyfunctional comonomers such as methylene-bis-acrylamide, $\alpha,\beta$-olefinically unsaturated carboxylic acid monomers containing 3–10 carbon atoms such as acrylic acid and the like are also readily employed as comonomers with acrylonitrile.

Especially attractive terpolymers are those made from butadiene or alkyl acrylate polymers with acrylonitrile which contain about 50–70% by weight butadiene or alkyl acrylate, 20–45% of acrylonitrile and up to about 20% by weight of other polymerizable vinylidene comonomers.

The manner in which the methanol is introduced into the system is critical because methanol can break the emulsion or suspension which result is undesirable. It has been found that an acceptable and convenient mechanism method for the introduction of methanol is in aqueous solution, i.e., generally a solution of about 40 to 60% methanol but in any event not greater than about 80% methanol. Water is preferred since it is not foreign to the system but other diluents will be apparent to those skilled in the art.

The temperature and pressure at which the acrylonitrile (39%)/methanol (61%) azeotrope is removed is not critical provided that the emulsion or suspension is not broken by the distillation procedure. Distillation under atmospheric pressure or vacuum has been found to be quite satisfactory.

The use of a stripping gas during the distillation is not necessary. However, its use is preferred to permit reduction of the temperature at which the distillation is conducted. Gases such as nitrogen, etc. which are inert to the materials in the system can be used.

The following examples are presented to illustrate but not to restrict the present invention. Parts and percentages are by weight unless otherwise specified.

EXAMPLE 1

100 gms. of an aqueous emulsion of a copolymer of 33% acrylonitrile and 67% butadiene (latex) containing 0.77% (7700 ppm) unreacted acrylonitrile was placed in a 250 ml. 3-neck flask fitted with a mechanical stirrer and distillation head with a foam expansion bulb. A solution of 10 ml. of methanol in 10 ml. of distilled water was slowly added with vigorous stirring. A stream of nitrogen was then bubbled through the stirred solution while it was being heated. After approximately 10 minutes the temperature of the foam above the latex reached 60° C. The temperature was maintained at 60° C. for 30 minutes during which time a total of 9 gms. of distillate was collected. After cooling, the latex was analyzed to contain (<10 ppm) acrylonitrile.

EXAMPLE 2

A 300 gm. portion of a latex produced by the polymerization of acrylonitrile (15%) with ethyl acrylate, butyl acrylate and acrylic acid containing 163 ppm residual acrylonitrile was placed in a 250 ml. 3-neck flask fitted with a thermometer, stirrer and distillation head. A solution of 10 ml. of methanol in 10 ml. distilled water was slowly added with stirring. The latex was then heated to 73° with a slow stream of nitrogen bubbling through and maintained at that temperature until 10 ml. of distillate was collected. After cooling, the latex was analyzed to <1 ppm acrylonitrile.

I claim:

1. A process for the removal of residual acrylonitrile in acrylonitrile polymers in aqueous emulsion comprising adding at least about 1.5 parts by weight of methanol for each part by weight of acrylonitrile in said emulsion said methanol being in a form that will not break the emulsion and thereafter distilling off a methanol-acrylonitrile azeotrope until the concentration of acrylonitrile in the polymer and emulsion is less than about 10 ppm.

2. The process of claim 1 wherein the methanol is introduced in the form of an aqueous solution containing not more than 80% by weight of methanol based upon the weight of solution.

3. The process of claim 2 wherein at least 7.5 parts of methanol are added.

4. The process of claims 2 or 3 wherein the distillation is conducted below about 100° C.

5. The process of claims 2 or 3 wherein the methanol is introduced as an aqueous solution containing 40-60% by weight of methanol.

* * * * *